United States Patent
Seiberlich et al.

(10) Patent No.: US 9,328,691 B2
(45) Date of Patent: May 3, 2016

(54) SETPOINT BANK CONTROL ARCHITECTURE

(71) Applicant: International Engine Intellectual Property Company, LLC, Lisle, IL (US)

(72) Inventors: Matthew Joseph Seiberlich, Libertyville, IL (US); Michael James McNulty, Lombard, IL (US); Jose Antonio Rodriguez, Chicago, IL (US); Jeremy Grant Schipper, Chicago, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 473 days.

(21) Appl. No.: 13/756,515

(22) Filed: Jan. 31, 2013

(65) Prior Publication Data

US 2013/0197779 A1    Aug. 1, 2013

Related U.S. Application Data

(60) Provisional application No. 61/593,045, filed on Jan. 31, 2012.

(51) Int. Cl.
*F02D 45/00* (2006.01)
*F02D 41/24* (2006.01)
(Continued)

(52) U.S. Cl.
CPC .............. *F02D 45/00* (2013.01); *F02D 41/005* (2013.01); *F02D 41/0047* (2013.01); *F02D 41/1454* (2013.01); *F02D 41/2422* (2013.01); *F02D 41/0007* (2013.01); *F02D 2200/0812* (2013.01);
(Continued)

(58) Field of Classification Search
CPC .................... F01N 2900/16; F01N 2900/1606; F01N 2550/04; F01N 2560/026; F01M 2011/1466; F02D 2200/0806; F02D 2200/0818
USPC .................. 701/102, 108, 109; 123/434–436, 123/672–674; 60/274–278, 285, 295, 297, 60/301, 311
See application file for complete search history.

(56) References Cited

U.S. PATENT DOCUMENTS 6,768,941 B2 * 7/2004 Sasena et al. ................. 701/114
6,778,898 B1 * 8/2004 Bidner et al. ................. 701/109
(Continued)

FOREIGN PATENT DOCUMENTS

WO    WO2009150790 A1    12/2009

OTHER PUBLICATIONS

Extended European Search Report dated Feb. 15, 2015.
(Continued)

*Primary Examiner* — John Kwon
*Assistant Examiner* — Johnny H Hoang
(74) *Attorney, Agent, or Firm* — Jack D. Nimz; Jeffrey P. Calfa (57) ABSTRACT

A method of controlling operation of an engine is provided that utilizes a number of preset operating parameters. The method determines an operating mode of the engine. The method determines an operating state of the engine. A plurality of engine parameter settings is retrieved from a memory in response to the determined operating mode and the determined operating state of the engine. The plurality of engine parameter settings are applied to at least one control algorithm of the engine.

20 Claims, 4 Drawing Sheets (51) Int. Cl.
*F02D 41/14* (2006.01)
*F02D 41/00* (2006.01)

(52) U.S. Cl.
CPC ......... *F02D 2250/36* (2013.01); *F02D 2250/38* (2013.01); *Y02T 10/47* (2013.01)

(56) References Cited

U.S. PATENT DOCUMENTS

| | | | |
|---|---|---|---|
| 6,816,774 B2* | 11/2004 | Yasui et al. | 701/108 |
| 7,243,017 B2* | 7/2007 | Gehret, Jr. | 701/103 |
| 7,278,304 B2* | 10/2007 | Zanini-Fisher et al. | 73/114.71 |
| 2003/0167757 A1 | 9/2003 | Boretto et al. | |
| 2005/0022776 A1* | 2/2005 | Montgomery | 123/295 |
| 2005/0216174 A1 | 9/2005 | Rodriguez | |
| 2008/0103684 A1* | 5/2008 | Allmer et al. | 701/114 |
| 2009/0306877 A1 | 12/2009 | Sasaki et al. | |
| 2010/0004812 A1 | 1/2010 | Merrick | |
| 2011/0184632 A1 | 7/2011 | Kang et al. | |
| 2011/0213542 A1* | 9/2011 | Chazal | 701/102 |
| 2011/0288730 A1 | 11/2011 | Schaffeld et al. | |
| 2012/0053814 A1* | 3/2012 | George et al. | 701/102 |
| 2013/0000601 A1* | 1/2013 | VanDerWege et al. | 123/435 |

OTHER PUBLICATIONS

The State Intellectual Property Office of the People's Republic of China Date of Dispatch Mar. 24, 2015 Application/Patent No. 201310039132.0 Search Report.

* cited by examiner

SETPOINT BANK CONTROL ARCHITECTURE

TECHNICAL FIELD

The present disclosure relates to control of numerous engine operating parameters used for combustion in an internal combustion engine, and more particularly to a system and method for controlling an engine using a number of setpoints for the engine.

BACKGROUND

Many factors, including environmental responsibility efforts and modern environmental regulations on engine exhaust emissions, have reduced the allowable acceptable levels of certain pollutants that enter the atmosphere following the combustion of fossil fuels. Increasingly, more stringent emission standards may require greater control over either or both the combustion of fuel and post combustion treatment of the exhaust. For example, the allowable levels of nitrogen oxides (NOx) and particulate matter have been greatly reduced over the last several years. Fuel injection timing and a quantity of fuel to be injected has been found to be an important factor in emission formation, along with other aspects such as exhaust gas recirculation (EGR), vane settings of variable geometry turbochargers (VGTs), intake manifold temperature, and intake valve timing.

An electronic engine control system thus may become very complicated in order to allow an engine to provide desirable performance, while also meeting required emissions limits. As the engine may be subjected to a variety of different operating tasks and operating conditions, a variety of engine operating parameters are controlled, such as fuel injection timing, fuel injection amount, fuel injection pressure, intake valve timing, exhaust valve timing, EGR valve settings, turbocharger settings, and the like. However, adjusting one engine parameter may counteract an adjustment made to another engine parameter, or may cause a greater change to engine operations than was intended when an adjustment is made to another engine parameter. It has been found that for a given engine operating condition, a number of engine operating parameters may be coordinated to a setpoint for the given engine operating condition, such that the setpoint allows the engine to generate a required power output, while also generating acceptable levels of NOx and particulate matter. A need exists for an engine control system that allows a plurality of setpoints for various engine operating conditions to be applied to an engine based on the operating conditions of the engine.

SUMMARY

According to one process, a method of controlling operation of an engine is provided that utilizes a number of preset operating parameters. The method determines an operating mode of the engine. The method determines an operating state of the engine. A plurality of engine parameter settings are retrieved from a memory in response to the determined operating mode and the determined operating state of the engine. The plurality of engine parameter settings are applied to at least one control algorithm of the engine.

According to another process, a method for controlling operation of an engine is provided that utilizes a number of preset operating parameters. An operating mode of the engine is determined A first provisional operating state of the engine is determined based upon a three-dimensional table of operating states. A second provisional operating state of the engine is determined based upon a one-dimensional table of operating states. One of the first provisional operating state and the second provisional operating state is selected. A plurality of engine parameter settings are retrieved from a memory in response to the determined operating mode and the selected operating state of the engine. The plurality of engine parameter settings are applied to at least one control algorithm of the engine.

According to a further process, a method controlling operation of an engine is provided that utilizes a number of preset operating parameters. An operating mode of the engine is determined A first operating state of the engine is determined A plurality of engine parameter settings are retrieved from a memory in response to the determined operating mode and the determined first operating state of the engine. The plurality of engine parameter settings are applied to at least one control algorithm of the engine. Engine emissions and engine combustion stability are monitored. A second operating state of the engine is determined when at least one of engine emissions and engine combustion stability fail to meet predetermined limits. A second plurality of engine parameter settings are retrieved from a memory in response to the determined operating mode and the determined second operating state of the engine. The second plurality of engine parameter settings are applied to at least one control algorithm of the engine.

DETAILED DESCRIPTION

Figure 1:
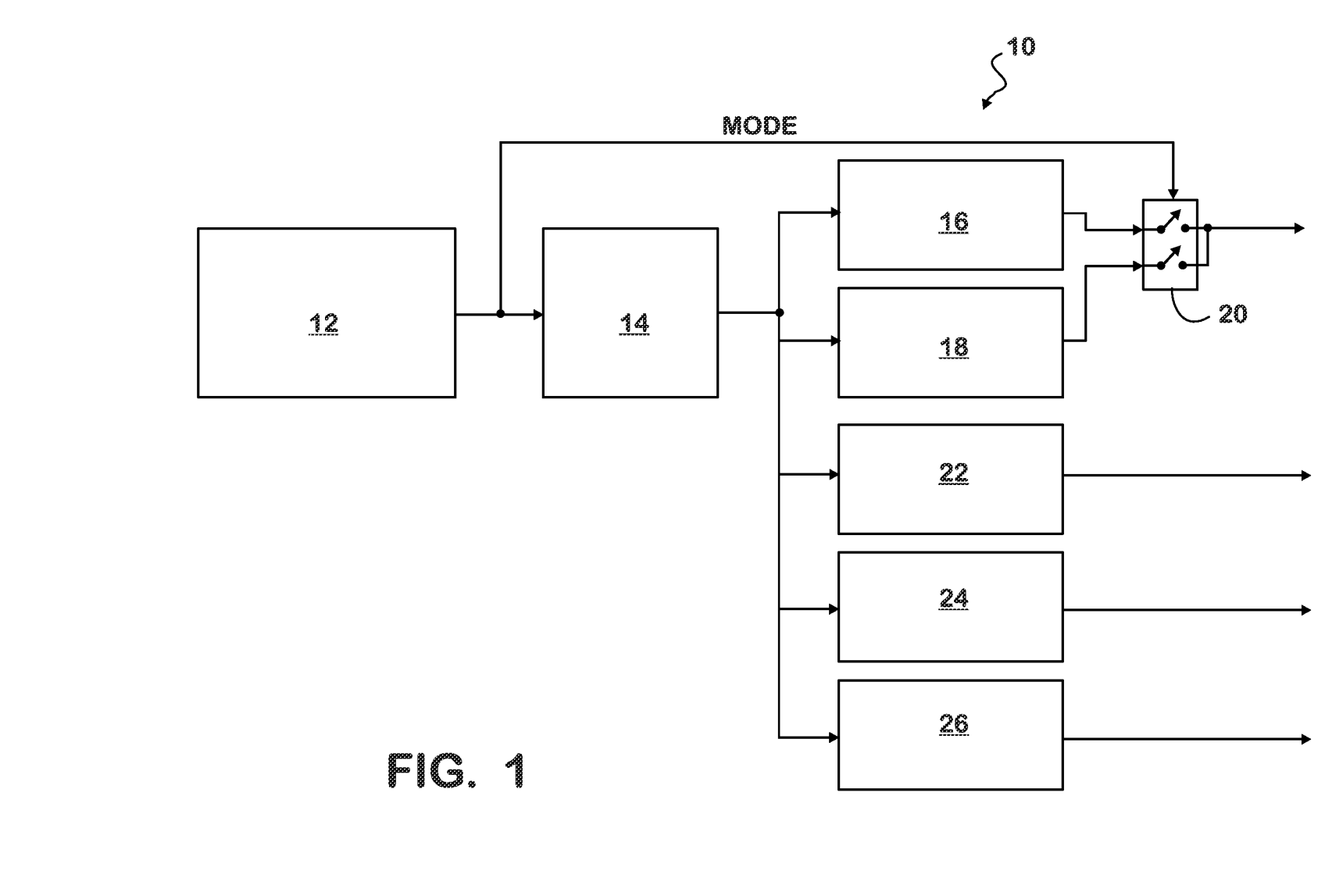
FIG. 1 is a block diagram of setpoint bank control system according to one embodiment.

FIG. 1 shows a block diagram indicating a setpoint bank engine control method 10. The method 10 has a setpoint selection portion 12. The setpoint selection portion may utilize a variety of inputs in order to determine information about the operating state of the engine and the ambient conditions surrounding the engine. For instance, the setpoint selection portion 12 may receive inputs that include an engine coolant temperature, an intake manifold temperature, an ambient pressure or altitude measurement, engine speed, engine torque output, a signal indicative of the engine being used to operate a power-take-off ("PTO"), an estimate of particulate matter generation since the engine was started, and a variety of other signals indicative of the engine operation, and the engine operating conditions.

The setpoint selection portion 12 utilizes these inputs to determine a mode and a state in which the engine is operating. The mode is indicative of a vocation or task that the engine is performing For instance, the engine mode may be normal operations, PTO operations, extended idling, stop and go operations, high-output operations, as well as other modes.

The state of the engine operation that is output from the setpoint selection logic indicate a NOx emission and engine combustion stability operating range. For instance a first state may offer a high level of engine combustion stability and a higher level of NOx emissions, while a second state provides for a lower level of engine combustion stability and a lower level of NOx emissions. Thus, if the engine control system determines that engine combustion stability is below a predetermined threshold, the state will be changed to improve engine combustion stability. Once acceptable combustion stability is obtained and sustained, it is contemplated that the state may be changed to a less stable but lower NOx producing state in order to minimize engine emissions.

Once the mode and the state have been chosen in the setpoint selection logic 12, the setpoint bank 14 is accessed. The setpoint bank 14 has a plurality of setpoint settings based on the mode and the state. Each of the plurality of setpoint settings contains all of the setpoints for the various engine operating parameters, such as fuel injection pressure, fuel injection timing, valve timing, EGR valve settings, variable geometry turbocharger settings, and the like. Thus, each of the plurality of setpoint settings contains a complete set of setting for the various engine operating parameters that allow the engine to output required power, while also producing allowable levels of emissions.

It is contemplated that the setpoint settings that populate the setpoint bank may be generated in multiple ways. In a first manner of generating setpoint settings, an engine is operated in an engine test cell, where instrumentation is able to accurately measure engine emissions and engine power outputs, while also allowing control of conditions within the test cell. For example, the atmospheric conditions within the test cell may be adjusted to simulate a variety of atmospheric pressures, temperatures, and intake air oxygen contents. Additionally, the test cell may allow a wide variety of engine loading conditions to be simulated, such as rapid acceleration, high load operation, low load operation, and idling. Based on the variety of simulated operating conditions, the settings for engine operating parameters may be optimized and stored in the setpoint bank.

Additionally, it is possible to generate setpoint settings using in-vehicle calibration of an engine during an engine development process. The in-vehicle calibration may be less desirable than test cell calibration, based on additional variables that are introduced during in-vehicle calibration, such as changing atmospheric conditions.

As shown in FIG. 1, the setpoint bank 14 outputs setpoints that are utilized to control various engine operating parameters. For instance, the setpoints are utilized to by a first EGR algorithm 16 and a second EGR algorithm 18 to control a position of an EGR valve and provide varying amounts of EGR to the engine intake manifold. The use of both a first EGR algorithm 16 and a second EGR algorithm 18 may provide more robust control of an EGR valve on the engine. More robust control of the EGR valve may better control engine emissions.

For example, output of the first EGR algorithm 16 and the second EGR algorithm 18 may be compared at a comparator 20 to determine which of the first EGR algorithm 16 and the second EGR algorithm 18 to utilize. The comparator 20 also receives the mode in which the engine is operating in from the setpoint selection logic 12. Based upon the inputs from the setpoint selection logic 12, the first EGR algorithm 16, and the second EGR algorithm 18, the comparator 20 selects the output that is used to control the EGR valve.

Similarly, the setpoint bank 14 setpoints are utilized by a turbo control algorithm 22 to control a variable geometry turbocharger. A variable geometry turbocharger typically is capable of altering geometry of vanes position on a turbine portion of the turbocharger to allow the turbocharger to be more efficient or responsive to varying operating conditions, and also may be used to control the level of boost generated by the turbocharger. The setpoints are used to position the vanes, or other adjustable elements of the turbocharger, based on the operating conditions of the engine.

A fuel control algorithm 24 is also provided that utilizes setpoints from the setpoint bank 14. The fuel control algorithm 24 uses the setpoints to control an amount of fuel to inject into the cylinders, a timing of the fuel injection, as well as a number of fuel injection events. For instance, the setpoints from the setpoint bank 14 are utilized by the fuel control algorithm to set a timing of a fuel injection event into the cylinder during a combustion cycle.

Additional engine control algorithms 26 may also be provided that utilize setpoints from the setpoint bank 14. For example, a variable valve timing control algorithm may use the setpoints to control the timing of the opening and closing of both intake valves and exhaust valves on an engine.

Figure 2:
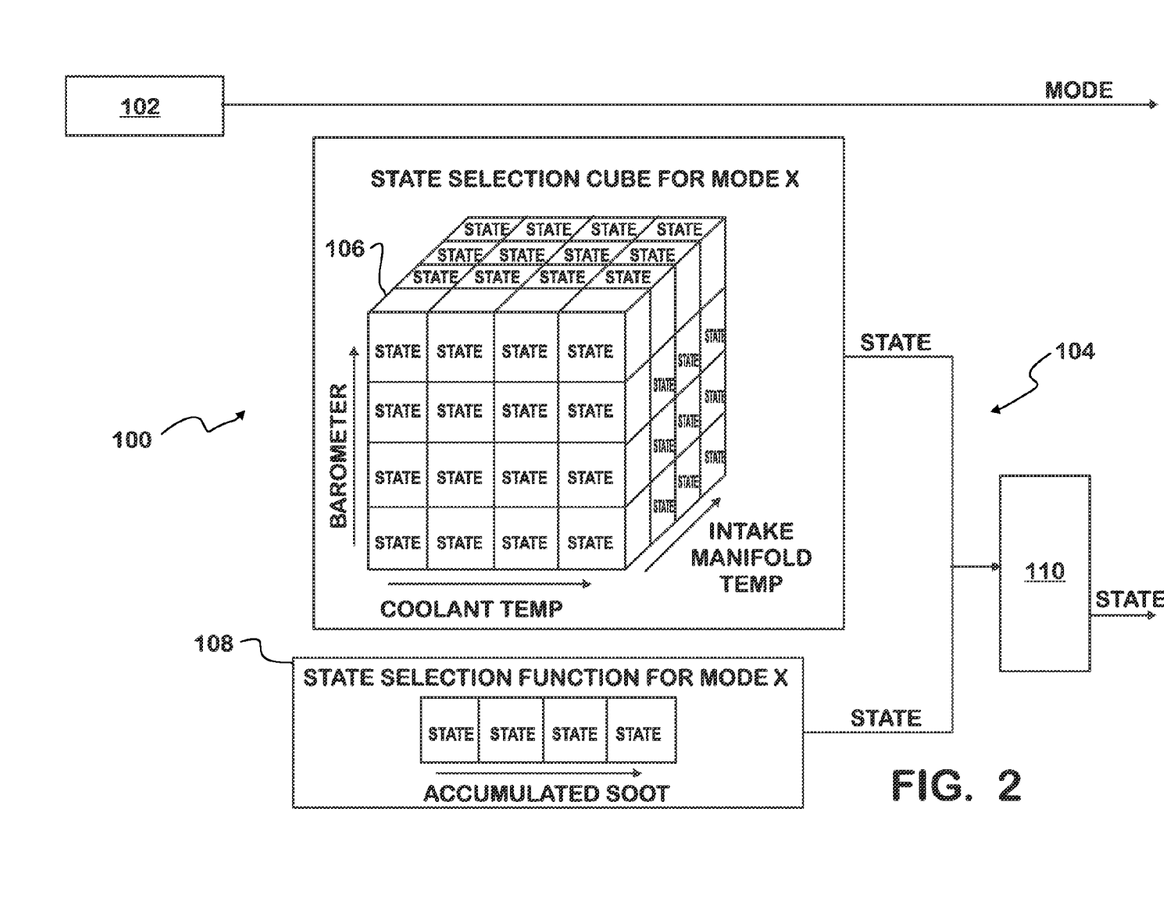
FIG. 2 is a block diagram of a setpoint bank control system according to another embodiment.

Turning now to FIG. 2, an alternative embodiment showing how a state for the setpoint bank is determined is depicted. A block diagram indicating a setpoint bank engine control method 100 includes a mode selection portion 102 and a state selection portion 104. As discussed above, the mode is based on the vocation of the engine, and thus is generally readily determined The state selection portion 104 includes a three-dimensional table 106. The three-dimensional table 106 arranges state outputs based on a plurality of measured data, such as barometric pressure, coolant temperature, intake manifold temperature, ambient temperature, boost pressure, intake manifold pressure, intake air flow, and the like. Based on the plurality of measured data, a state from the three-dimensional table 106 is determined The state selection portion 104 additionally comprises a one-dimensional table 108. As shown in FIG. 2, the one-dimensional table 108 may be based on a model of an engine characteristic, such as particulate matter accumulation, intake oxygen percentage, exhaust manifold oxygen concentration, and intake charge utilization. The one-dimensional table 108 has a plurality of states based on the model of an engine characteristic selected. A state from the one-dimensional table 108 is determined.

A comparator 110 receives the state selected by both the three-dimensional table 106 and the one-dimensional table 108. The comparator 110 may be programmed to select the state based on a variety of considerations based upon any difference between the state generated from the three-dimensional table 106 and the one-dimensional table 108.

For instance, it may be found in some circumstances that the state selected by the one-dimensional table 108 should control if the differences in states selected by the one-dimensional table 108 and the three-dimensional table 106 exceeds a predetermined number of states. In such a scenario, the attribute of the one-dimensional table 108 is deemed more important to engine operation than the state selected by the three-dimensional table 106.

Similarly, in other engine operating conditions, it may be found that the state selected by the three-dimensional table 106 should control if the differences in states selected by the one-dimensional table 108 and the three-dimensional table 106 exceeds a predetermined number of states. In such a scenario, the attribute of the three-dimensional table 106 is deemed more important to engine operation than the state selected by the one-dimensional table 108. The importance of the selection of the state from the three-dimensional table 106 and the one-dimensional table 108 may be determined based on engine calibration activity, such as that performed in an engine test cell, or in-vehicle engine testing.

Thus, the setpoint bank 14 provides for engine operating parameters to be set during steady-state operation and applied to a wide variety of engine operating conditions that an engine may experience. The setpoint bank allows for setpoints to change when the function of the engine is changed, the mode, and allows the state to change when combustion becomes unstable, or when emissions are not being met. Thus, the setpoint bank 14 allows for greater control of engine operation, regardless of engine operating conditions.

Figure 3:
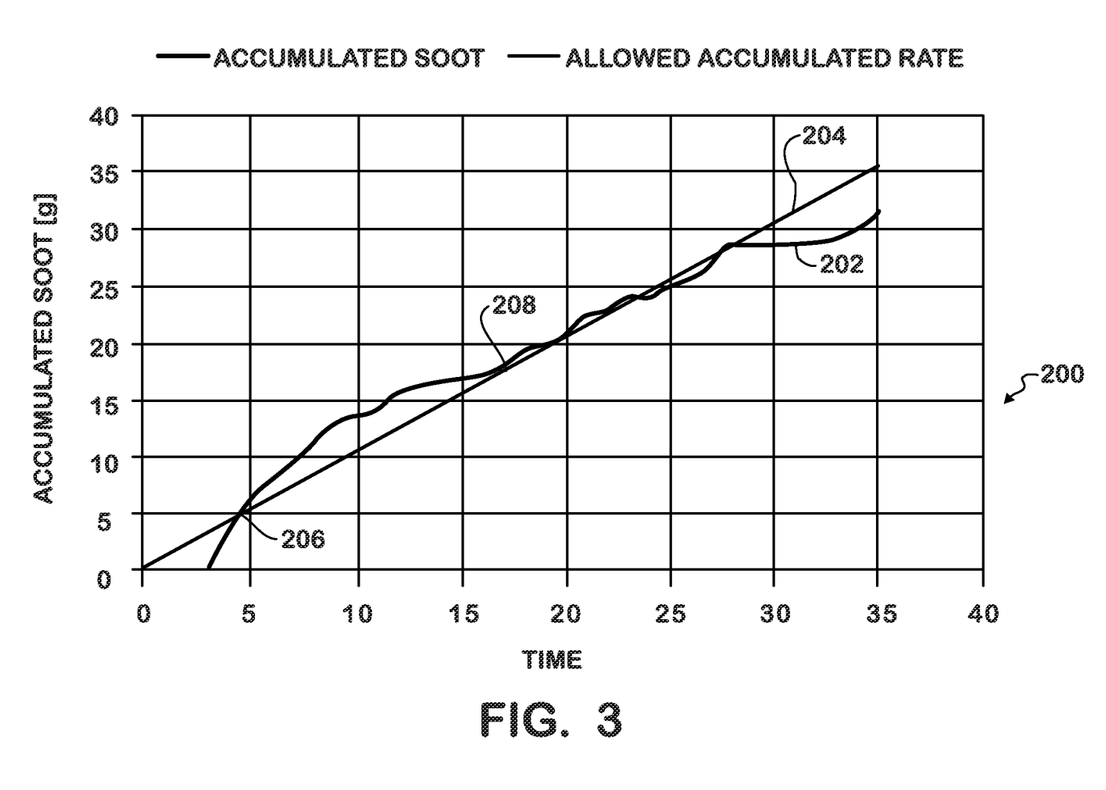
FIG. 3 is a chart showing particulate natter accumulation.

As mentioned above in connection with FIG. 2, the engine may be configured to choose setpoints based on specific engine operating conditions such as particulate matter accumulation. FIG. 3 shows a chart 200 showing accumulated particulate matter 202, such as an amount of particulate matter accumulated in a diesel particulate filter (DPF) within an exhaust system for the engine, compared to an allowed rate of particulate matter accumulation 204. The use of a particulate matter accumulation model to control the setpoints selected from the setpoint bank may be beneficial for numerous reasons. First, excessive particulate matter accumulation may cause the DPF to need replacement prematurely. As the DPF can be an expensive component, a reduced lifespan of the DPF is detrimental. Further, excessive particulate matter accumulation in the DPF will result in more frequent regenerations of the DPF. The regeneration of the DPF requires additional fuel usage, thereby reducing the observed fuel economy of the vehicle.

As shown in FIG. 3, at point 206 where the accumulated particulate matter 202 surpasses the allowed rate of particulate matter accumulation 204, the setpoints from the setpoint bank used to operate the engine will be changed to setpoints that generate less particulate matter during combustion. The setpoints may be arranged based on observed rates of particulate matter accumulation generated for a particular setpoint, data that may be obtained during engine calibration. Thus, the engine will operate a setpoint to generate less particulate matter during combustion until accumulated particulate matter 202 falls below the allowed rate of particulate matter accumulation 204, as shown at point 208.

It is contemplated that once the engine is operating below the allowed rate of particulate matter accumulation 204 at point 208, the engine may be allowed to utilize the previous setpoint that was generating more particulate matter.

It is contemplated that combustion stability and/or NOx emissions may prevent the engine from operating with setpoints that generate less particulate matter during some engine operating conditions, and at such times the engine will operate to meet allowable NOx emissions levels and/or combustion stability requirements. However, once engine operations allow for reduced particulate matter formation combustion, setpoints will be utilized to generate reduced levels of particulate matter during combustion.

It has been found that the use of the percent of oxygen within the engine intake manifold can be used to effectively control a position of an EGR valve on an engine to control the amount of EGR provided to the engine intake manifold. Previous attempts to control an amount of EGR provided to the engine intake manifold have relied on a percentage of EGR being provided to the intake system. However, it has been found that engine NOx production more closely tracks the percent of oxygen within the intake manifold than the percentage of EGR being provided to the engine.

It has been found that the following formula may be used to determine the percent of oxygen within the intake manifold:

$$\text{Intake O}_2 \ \% = 20.9\left(1 - \frac{EGR}{\lambda}\right)$$

where $\lambda$ is the measured amount of oxygen within the exhaust, and EGR is the percent of EGR being provided to the engine. It has been found that sensors to measure the amount of oxygen within the exhaust are more reliable than a sensor to directly measure the amount of oxygen within the intake manifold, as oxygen sensors are sensitive to heat and vibration.

It has also been found that the use of oxygen within the intake manifold of the engine for control of EGR may be beneficial during transient engine operations, such as during rapid acceleration when increased airflow is needed for combustion of an increased quantity of fuel and may lower the quantity of oxygen within the exhaust. Thus, even though the flow rate of air through the intake of the engine may be similar to other operating conditions, the EGR may have a lower quantity of oxygen, thus the intake manifold oxygen percentage will also be lower. Therefore, the rate of EGR in such an operating condition need not be as high, based on the reduced amount of oxygen within the exhaust, in order to sufficiently reduce the NOx formed during combustion. Put another way, by controlling the amount of EGR provided based on the amount of oxygen present in the intake manifold, more accurate control of the level of diluent (exhaust gas) is provided, allowing more precise control of the NOx emissions of the engine.

Further, the use of oxygen within the intake manifold to control EGR levels in the engine allows for more accurate emissions controls between individual engines, each of which having slightly different operating parameters. For instance, a first engine may have a turbocharger that produces slightly more boost than a turbocharger on a second engine, even if the engines are the same model, and utilize the same model turbocharger. Thus, by using the amount of oxygen actually within the intake manifold, slight variations between the first engine and the second engine may be accounted for and more precise levels of EGR may be provided to the engines in order to reduce NOx emissions. Therefore, the same control software will result in similar NOx emissions between the engines with slight differences.

Another control strategy that may be utilized on an engine involves the use of a turbocharger control concept. Many engine control systems utilize an intake manifold pressure in order to control a waste gate on a turbocharger or vanes of a variable geometry turbocharger. However, the control of intake manifold pressure is typically not what actually is desired to be controlled by the waste gate or the vane setting, rather, control of the turbocharger is generally desired in order to provide a desired amount of oxygen within the intake manifold. Thus, traditional turbocharger control strategy will generate a particular flow rate, or flow volume to the intake manifold, regardless of the content of that fluid flow. This has been found to result in flow rates within the intake manifold that do not correspond with advantageous engine operating conditions. Additionally, certain current engine operating conditions produce a higher boost or greater flow rate than required for engine operation, thereby limiting the flow rate of engine exhaust available for use in the EGR system.

The present embodiment controls the turbocharger based upon a required intake manifold oxygen content. In order to control the turbocharger, a desired amount of boost and a desired flow rate are retrieved from the setpoint bank based on the engine's operating conditions. Using the following equation:

$$\dot{\omega} = C_p \dot{m} T \left( PQ^{\frac{y-1}{y}} - 1 \right)$$

where ω is the power required of the turbine of the turbocharger, $C_p$ is a constant, m is the mass flow rate, T is the temperature, PQ is the pressure quotient or boost of the turbocharger, and y is the specific weight of the fluid. Thus, by using the desired boost set point and the desired mass flow rate from the setpoint bank, the power required to be generated by the turbine can be calculated. Based on the actual measured mass flow rate in the intake manifold and the required turbine power output, the pressure quotient that is actually needed may be calculated, and the vanes of the variable geometry turbocharger or the position of the waste gate of the turbocharger may be set in order to control the pressure quotient. In this manner, the turbocharger may be controlled for a variety of engine operating conditions.

Finally, it has been noted that control of engine emissions during transient operations may be difficult, as obtaining allowable particulate matter emissions and NOx emissions, while simultaneously generating required torque, requires control of a great deal of parameters. Current engines attempt to maintain one of particulate matter emissions, NOx emissions, and torque output, while varying the other two during transient operations. However, a change of engine operating parameters to maintain the one of one of particulate matter emissions, NOx emissions, and torque output, generally has an effect on at least one of the other two. It has been found that particulate emissions may be controlled based upon the air/fuel ratio of the engine, NOx may be controlled by the amount of EGR provided to the engine, and that torque output may be controlled by the amount of fuel provided to the engine.

Figure 4:
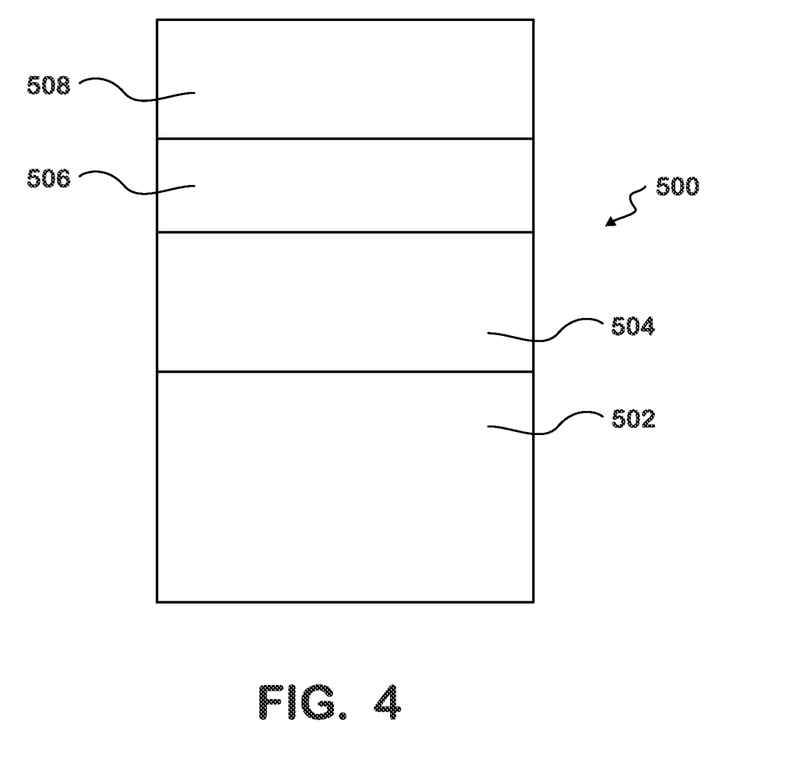
FIG. 4 is a schematic diagram showing a volume of a cylinder of an engine.

FIG. 4 shows a representative view of a volume within a cylinder 500 having a piston 502, a minimum amount of air needed for combustion 504, an amount of diluent in the form of exhaust gas that has passed through the EGR system 506, and excess air 508. During certain transient engine operations, an insufficient amount of air required to combust fuel, or an insufficient amount of diluent may be present to provide for an allowable level of NOx during combustion. In such a situation, the engine is not capable of producing the desired torque, or is not capable of meeting NOx emissions targets. Put another way, there are some operating conditions where the amount of air needed for combustion of fuel at the desired air/fuel ratio and the amount of exhaust gas diluent required to lower NOx emissions exceed the volume of the cylinder.

In order to determine an amount of air needed for combustion, a desired torque output has setpoints for fueling, and EGR rates. In order to calculate the total flow of air required for the engine:

$$\text{Airflow} = \frac{\frac{A}{F} \min \times \text{Fuel}}{1 - \frac{EGR\ \%}{100}}$$

where A/F min is the minimum allowable air/fuel ratio, fuel is the amount of fuel required to generate the desired torque, and EGR % is the percentage of EGR provided to the engine.

EGR % can be calculated as a function of intake manifold oxygen content and the air fuel ratio of the exhaust gas using the following equation:

$$EGR\ \% = 100 \times \left( \frac{20.9 - \text{Intake } O_2\ \%}{20.9 - f(a/f)} \right)$$

where f(a/f) is an amount of oxygen within the exhaust gas.

Thus, the total air flow may be expressed as:

$$\text{Airflow} = \frac{\frac{A}{F} \min \times \text{Fuel}}{1 - \left( \frac{100 \times \left( \frac{20.9 - \text{Intake } O_2\ \%}{20.9 - f(a/f)} \right)}{100} \right)}$$

Thus, based on measurements of the air/fuel ratio within the exhaust, the speed of the engine, an amount of torque the engine can generate may be calculated. Thus, a table may be created for given NOx emissions levels that contain the maximum torque that may be generated. Thus, if the desired amount of torque exceeds the available maximum torque, the engine control may use a different table, such as a second table that allows for a higher NOx emission level, which would typically utilize less EGR, thereby allowing additional air flow, allowing for the combustion of additional fuel. While the NOx emission level may be allowed to rise, it is still limited, and therefore always controlled. If the maximum allowable NOx level is reached and the engine is still not capable of generating the desired torque, the engine will simply generate the most torque possible while still meeting the allowed NOx level.

The particulate emissions of the engine are controlled by the air/fuel ratio. Therefore, the present control strategy coordinates both fuel requirements and EGR requirements to ensure that proper intake manifold oxygen content is maintained.

Thus, such a control strategy allows for three types of operation for the engine. The first type of operation involves a desired torque that is less than the maximum torque the engine can generate while operating at a low NOx emissions level based on the oxygen content of the intake manifold. In such a type of operation, the amount of fuel provided to the engine may be increased to produce the desired torque, without having to change the setpoint of oxygen content of the intake manifold.

The second type of operation involves a desired torque that is greater than the maximum torque the engine can generate while operating a low NOx emissions level based on the oxygen content within the intake manifold, but is less than the maximum torque that the engine can generate based on the second table that allows for greater NOx emissions. In such a situation the setpoint will be changed to one from the second table that allows for greater NOx emissions.

The final type of operation involves a desired torque that is greater than the maximum torque the engine can generate based on the second table that allows for greater NOx emissions. In such a situation, the setpoint is changed to one from the second table that allows for greater NOx emissions, and the engine is provided with an amount of fuel that will generate the maximum torque for that particular setpoint. However, the engine will not be able to generate the desired amount of torque. Thus, until operating conditions change, the engine will not be able to provide the desired amount of torque in this third type of operation.

Tables may be created during calibration of the engine that contain engine speed, total flow through the intake manifold, and total torque available for various intake manifold oxygen concentrations. Thus, based on these tables, an engine controller may determine whether a requested torque output of the engine may be generated based on current engine operating conditions. Therefore, the engine controller may quickly ascertain if changes to the EGR rate and the intake manifold oxygen content may be made to support the amount of fuel required to generate the requested torque output, or if the requested torque output is not able to be achieved by the engine at those operating conditions. By increasing the intake manifold oxygen content, the EGR rate is typically reduced, thereby allowing increased amounts of fuel to be combusted to generate increased torque, but also typically causing increased NOx emissions. Thus, a maximum torque that may be generated by the engine is limited by the maximum NOx emissions that are allowed.

One key advantage of the use of a setpoint control strategy is that recalibration of the engine is not required for changes in engine hardware. This greatly simplifies control of the engine and reduces the number of variables that are adjusted. By making coordinated adjustments based on settings from the setpoints, the engine will perform more consistently and will more likely generate expected performance and emissions levels.

It will be understood that a control system may be implemented in hardware to effectuate the method. The control system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

When the control system is implemented in software, it should be noted that the control system can be stored on any computer readable medium for use by or in connection with any computer related system or method. In the context of this document, a "computer-readable medium" can be any medium that can store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical) and a portable compact disc read-only memory (CDROM) (optical). The control system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

What is claimed is:

1. A method of controlling operation of an engine utilizing a number of preset operating parameters, the method comprising:
    determining an operating mode of the engine;
    determining an operating state of the engine;
    retrieving a plurality of engine parameter settings from a memory in response to the determined operating mode and the determined operating state of the engine; and
    applying the plurality of engine parameter settings to at least one control algorithm of the engine.

2. The method of claim 1, wherein the operating mode is determined based on a task the engine is performing.

3. The method of claim 2, wherein the operating mode is based on an expected load factor of the engine.

4. The method of claim 1, wherein the at least one control algorithm is a EGR control algorithm.

5. The method of claim 1, wherein the at least one control algorithm is a turbocharger control algorithm.

6. The method of claim 1, wherein the at least on control algorithm is a fuel control algorithm.

7. The method of claim 1, wherein determining the operating state is based on at least one measured characteristic.

8. The method of claim 7, wherein the measured characteristic comprises atmospheric pressure.

9. The method of claim 7, wherein the measured characteristic comprises coolant temperature.

10. The method of claim 7, wherein the measured characteristic comprises intake manifold temperature.

11. The method of claim 1, wherein determining the operating state is based on a model of at least one engine characteristic.

12. The method of claim 11, wherein the model of at least one engine characteristic comprises intake manifold oxygen concentration.

13. The method of claim 11, wherein the model of at least one engine characteristic comprises a rate of particulate matter accumulation.

14. The method of claim 11, wherein the model of at least one engine characteristic comprises exhaust manifold oxygen concentration.

15. A method controlling operation of an engine utilizing a number of preset operating parameters, the method comprising:
    determining an operating mode of the engine;
    determining a first provisional operating state of the engine based upon a three dimensional table of operating states;
    determining a second provisional operating state of the engine based upon a one dimensional table of operating states;
    selecting one of the first provisional operating state and the second provisional operating state;
    retrieving a plurality of engine parameter settings from a memory in response to the determined operating mode and the selected operating state of the engine; and
    applying the plurality of engine parameter settings to at least one control algorithm of the engine.

16. The method of claim 15, wherein the selecting one of the first provisional operating state and the second provisional operating state is based on an output of a comparator.

17. The method of claim 15, wherein the one-dimensional table is based upon a model of an engine characteristic.

18. The method of claim 15, wherein the three-dimensional table is based upon a plurality of measured data.

19. A method controlling operation of an engine utilizing a number of preset operating parameters, the method comprising:
    determining an operating mode of the engine;
    determining a first operating state of the engine;
    retrieving a plurality of engine parameter settings from a memory in response to the determined operating mode and the determined first operating state of the engine;
    applying the plurality of engine parameter settings to at least one control algorithm of the engine;
    monitoring engine emissions and engine combustion stability;

determining a second operating state of the engine when at least one of engine emissions and engine combustion stability fail to meet predetermined limits;

retrieving a second plurality of engine parameter settings from a memory in response to the determined operating mode and the determined second operating state of the engine; and applying the second plurality of engine parameter settings to at least one control algorithm of the engine.

20. The method of claim 19, wherein the engine emissions comprise NOx emissions.

\* \* \* \* \*